(12) United States Patent
Christian et al.

(10) Patent No.: US 9,196,878 B2
(45) Date of Patent: Nov. 24, 2015

(54) STACKABLE CARTRIDGE MODULE DESIGN

(71) Applicant: GM GLOBAL TECHNOLOGY OPERATIONS LLC, Detroit, MI (US)

(72) Inventors: Benjamin R. Christian, Novi, MI (US); Herman K. Phlegm, Oak Park, MI (US); John G. Dorrough, Oak Park, MI (US); Sami A. Syed, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 13/681,992

(22) Filed: Nov. 20, 2012

(65) Prior Publication Data

US 2014/0141308 A1 May 22, 2014

(51) Int. Cl.
*H01M 2/02* (2006.01)
*H01M 2/10* (2006.01)
*H01M 10/04* (2006.01)

(52) U.S. Cl.
CPC .......... *H01M 2/1016* (2013.01); *H01M 2/0245* (2013.01); *H01M 2/1077* (2013.01); *H01M 10/0481* (2013.01); *H01M 2220/20* (2013.01); *Y10T 29/49108* (2015.01)

(58) Field of Classification Search
CPC ...................... H01M 10/5053; H01M 10/5055; H01M 10/5057; H01M 2/0245; H01M 2/1061; H01M 2/0207; H01M 2/021; H01M 10/5004
See application file for complete search history.

(56) References Cited

U.S. PATENT DOCUMENTS

| | | | |
|---|---|---|---|
| 2005/0208375 A1* | 9/2005 | Sakurai | 429/162 |
| 2006/0024566 A1* | 2/2006 | Plummer | 429/100 |
| 2008/0160395 A1* | 7/2008 | Okada et al. | 429/99 |
| 2009/0104512 A1* | 4/2009 | Fassnacht et al. | 429/120 |
| 2010/0104935 A1* | 4/2010 | Hermann et al. | 429/120 |
| 2010/0178547 A1* | 7/2010 | Li | 429/151 |
| 2010/0301807 A1* | 12/2010 | Gamboa et al. | 320/118 |
| 2011/0236740 A1* | 9/2011 | Paolazzi et al. | 429/120 |
| 2012/0070718 A1* | 3/2012 | Motohashi | 429/156 |
| 2012/0171544 A1* | 7/2012 | Gutsch et al. | 429/120 |
| 2012/0171545 A1* | 7/2012 | Hohenthanner et al. | 429/120 |
| 2012/0196174 A1* | 8/2012 | Mikus et al. | 429/153 |
| 2012/0219836 A1* | 8/2012 | Heise | 429/120 |
| 2012/0219846 A1* | 8/2012 | Chan | 429/159 |
| 2012/0227931 A1* | 9/2012 | Heckenberger et al. | 165/41 |
| 2012/0231318 A1* | 9/2012 | Buck et al. | 429/120 |
| 2013/0011719 A1* | 1/2013 | Yasui et al. | 429/159 |
| 2013/0035103 A1* | 2/2013 | Mujtaba et al. | 455/450 |
| 2013/0157099 A1* | 6/2013 | Anderson | 429/120 |
| 2014/0017551 A1* | 1/2014 | Suzuki | 429/152 |

FOREIGN PATENT DOCUMENTS

WO   WO 2011029776 A1 *  3/2011
WO   WO 2011030194 A1 *  3/2011

* cited by examiner

*Primary Examiner* — Ula C Ruddock
*Assistant Examiner* — Scott J Chmielecki
(74) *Attorney, Agent, or Firm* — Brooks Kushman P.C.

(57) ABSTRACT

A battery assembly includes a plurality of stacked battery cartridges. Each battery cartridge includes a first receptacle unit, a battery cell stack, and a second receptacle unit positioned within first receptacle unit. The battery cell stack includes a first battery cell, a second battery cell, and a foam layer interposed between the first battery cell and the second battery cell. The battery cell stack is positioned within the first receptacle unit, with the second receptacle unit compressing the battery cell stack. The battery module assembly also includes a receiving assembly that holds the plurality of battery cartridges.

9 Claims, 4 Drawing Sheets

STACKABLE CARTRIDGE MODULE DESIGN

STATEMENT REGARDING FEDERALLY SPONSORED RESEARCH OR DEVELOPMENT

The invention was made with Government support under Contract No. DE-FC26-08NT04386. The Government has certain rights to the invention.

FIELD OF THE INVENTION

In at least one aspect, the present invention relates to battery module assemblies and to methods of making battery module assemblies.

BACKGROUND

Large capacity rechargeable batteries are currently being investigated for use in electric vehicles. The ultimate feasibility of electric vehicles depends on significantly reducing the associated costs. Reduction in the costs of battery assemblies is particularly important.

Lithium ion batteries are an important type of battery technology. Most battery assemblies, including lithium ion battery assemblies, include a plurality of individual electrochemical cells. Typically, such electrochemical cells include an anode and a cathode. Typically, the anode includes a metal sheet or foil (usually copper metal) over-coated with a graphitic layer. Similarly, the cathode usually includes a metal sheet or foil (usually aluminum metal) over-coated with a lithium-containing layer. Finally, electrochemical cells include an electrolyte which is interposed between the anode and the cathode. Terminals allow the generated electricity to be used in an external circuit. Electrochemical cells produce electricity via an electrochemical reaction.

For high power application, a plurality of battery cells are utilized and assembled into a battery module. Moreover, such battery modules are assembled into battery packs which include a cooling system and related electronics for operating the batteries. The cooling systems typically include a plurality of metallic cooling fins (e.g., copper and/or aluminum) interspersed between the battery cells. It turns out that the assembly of such battery modules is fairly difficult with respect to aligning the cooling fins and the battery cells.

Accordingly, there is a need for improved battery module assemblies and for methods of constructing such battery module assemblies.

SUMMARY OF THE INVENTION

The present invention solves one or more problems of the prior art by providing a battery module assembly. The battery assembly includes a plurality of stacked battery cartridges. Each battery cartridge includes a first receptacle unit, a battery cell stack, and a second receptacle unit positioned within the first receptacle unit. The battery cell stack includes a first battery cell, a second battery cell, and a foam layer interposed between the first battery cell and the second battery cell which allows for cell expansion during cycling, and maintaining intimate contact between the cell, cooling fin, and heat sink. The battery cell stack is positioned with the first receptacle unit with the second receptacle unit compressing the battery cell stack. The battery module assembly also includes a receiving assembly that holds the plurality of battery cartridges.

In another embodiment, a method of making the battery module assembly set forth above is provided. The method includes a step of forming a plurality of battery cartridges. The plurality of battery cartridges are positioned between a first heat sink section and a second heat sink section. Each battery cartridge is bonded to the first heat sink section and second heat sink section. Moreover, each battery cartridge is made by placing a battery cell stack within a first receptacle unit. Characteristically, the battery stack includes a first battery cell, a second battery cell, and a foam layer interposed between the first battery cell and the second battery cell. The battery cell stack is positioned within the first receptacle unit, with the second receptacle unit positioned within the first receptacle unit the battery cell stack is compressed.

BRIEF DESCRIPTION OF THE DRAWINGS

Exemplary embodiments of the present invention will become more fully understood from the detailed description and the accompanying drawings, wherein.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary.

Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
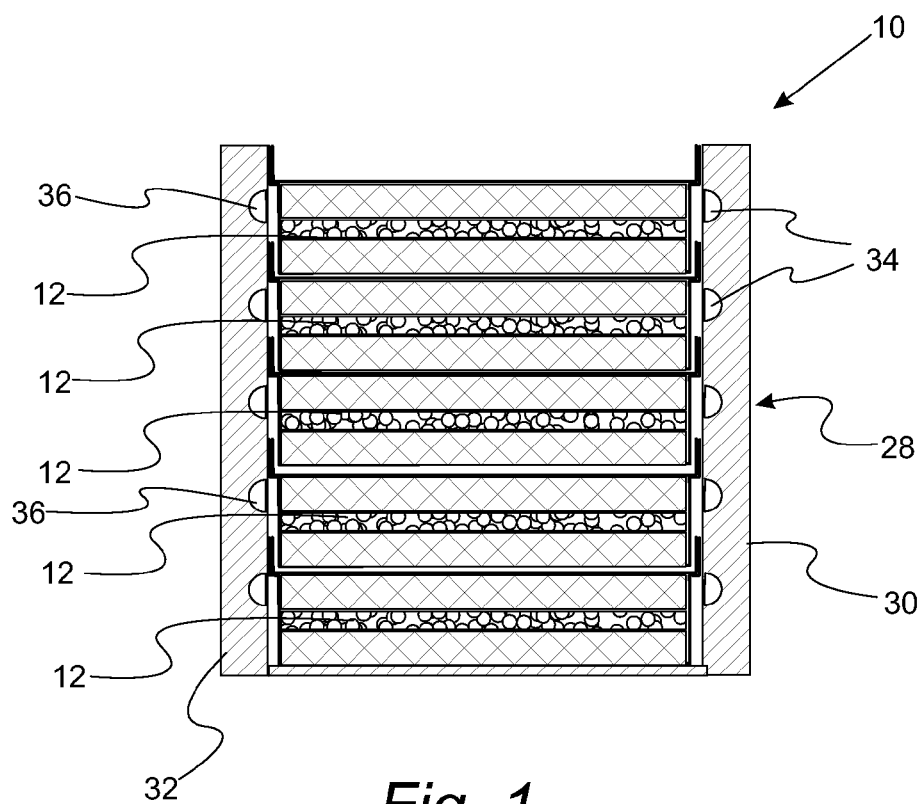
FIG. 1 is a schematic illustration of a battery module having a plurality of battery cartridges.
Figure 2:
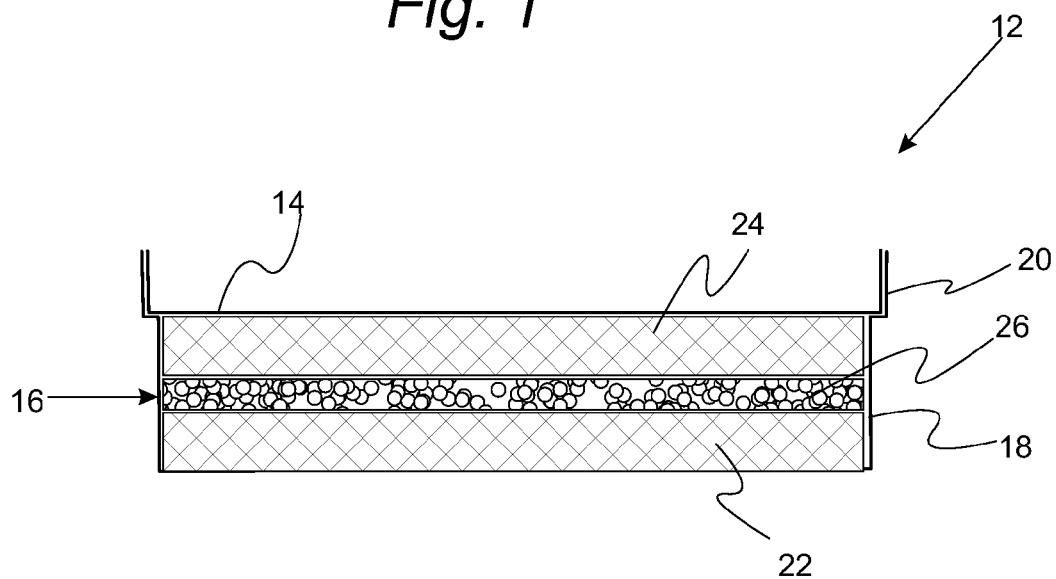
FIG. 2 is a schematic illustration of a battery cartridge.

With reference to FIGS. 1 and 2, schematic illustrations of a battery assembly that includes a plurality of battery cartridges are provided. FIG. 1 is a schematic illustration of a battery module having a plurality of battery cartridges. FIG. 2 is a schematic illustration of a battery cartridge. Battery assembly 10 includes several battery cartridges 12. Each battery cartridge 12 includes first receptacle unit 14, a battery cell stack 16, and a second receptacle unit 18. In a refinement, first receptacle unit 14 includes edge detail 20 that mates to second receptacle unit 18. In another refinement, edge detail 20 includes a rim which receives second receptacle unit 18. Second receptacle 18 is positioned within first receptacle unit 14 and particularly within edge detail 20. First receptacle unit 14 and the second receptacle unit 18 are formed from a thermally conductive material such as a metal. Examples of suitable metals include, but are not limited to, aluminum, copper, and combinations thereof.

Figure 3:
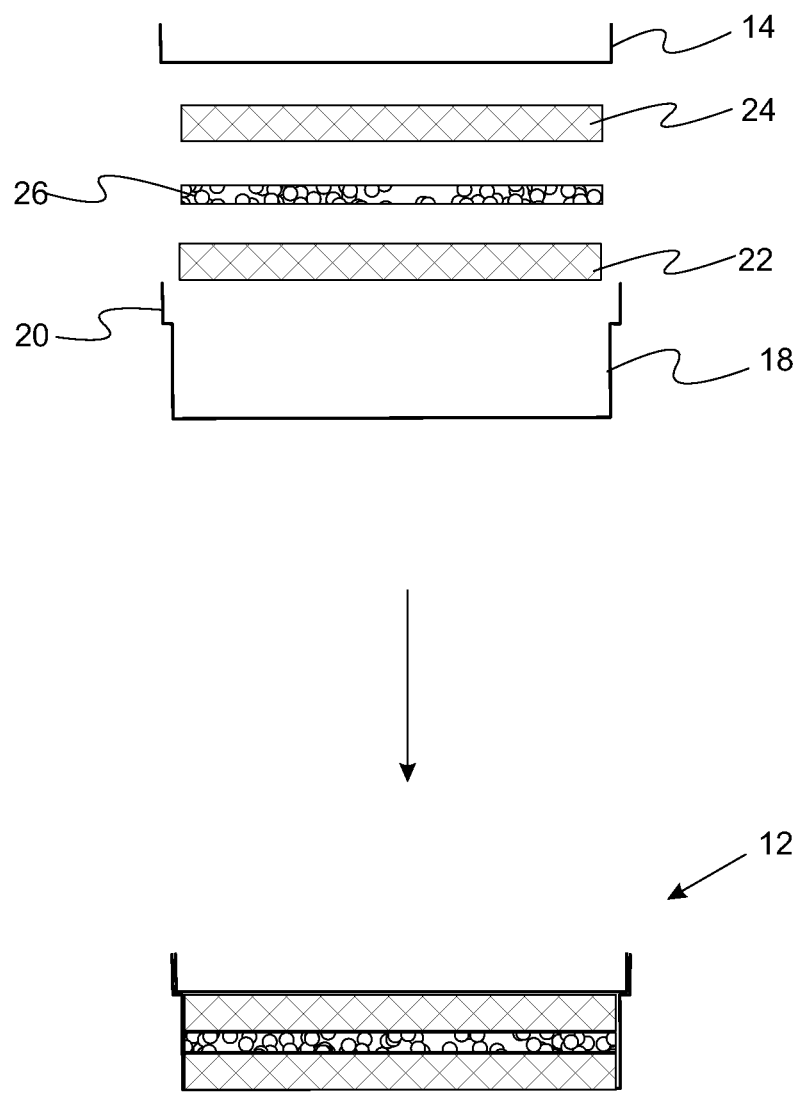
FIG. 3 is a schematic flowchart showing the assembly of a battery cartridge.

With reference to FIGS. 1, 2, and 3, each battery cell stack 16 includes a first battery cell 22, a second battery cell 24, and a foam layer 26 interposed between the first battery cell and the second battery cell. Battery cell stack 16 is positioned within first receptacle unit 12, with second receptacle unit 18 compressing the battery cell stack so that the space between first receptacle unit 14 and second receptacle unit 18 is filled. Foam layer 26 is typically formed from a compressible polymer such as polyurethane, polyester, polyether, and the like, and combinations thereof. In particular, polyurethane foam pads are formed from isocyantes, polyols, chain extenders such as ethanolamine, diethanolamine ethylene glycol, diethylene glycol, catalysts and surfactants. Examples of isocyantes include, but are not limited to, toluene diisocyante, diphenylmethane diisocyante, and combinations thereof. Examples of polyols include, but are not limited to, polyether polyols. Examples of chain extenders include, but are not limited to, ethanolamine, diethanolamine ethylene glycol, diethylene glycol, and combinations thereof. Examples of catalysts include, but are not limited to, triethlyene diamine, dimethylcyclohexamine, and combinations thereof. Examples of surfactants include, but are not limited to, polydimethylsiloxane, nonylphenyl ethoxylates, silicone oils, and polyoxylene block copolymers and combinations thereof.

Although FIG. 1 provides an example in which battery module assembly 10 includes 5 battery cartridges 12. It should be appreciated that battery module 10 may include virtually any number of battery cartridges. In a typically application, battery module assembly 10 includes from 5 to 30 battery cartridges. In a refinement, battery module assembly 10 includes a sufficient number of battery cartridges so that the output voltage is about 0.5 volts. Battery module assembly 10 also includes receiving assembly 28 that holds the plurality of battery cartridges 12. Battery module 10 is bonded to metallic (e.g., copper and/or aluminum) heat sink sections 30 and 32 in order to provide enhanced thermal conduction from the battery cartridges to the heat sink sections. In this regard, first receptacle unit 14 and second receptacle unit 18 operate as the cooling fins of the prior art. In a refinement, receiving assembly 28 includes heat sink sections 30 and 32 which optionally include cooling channels 34 and 36 through which cooling fluid is flowed during operation of the battery module assembly.

Figure 4:
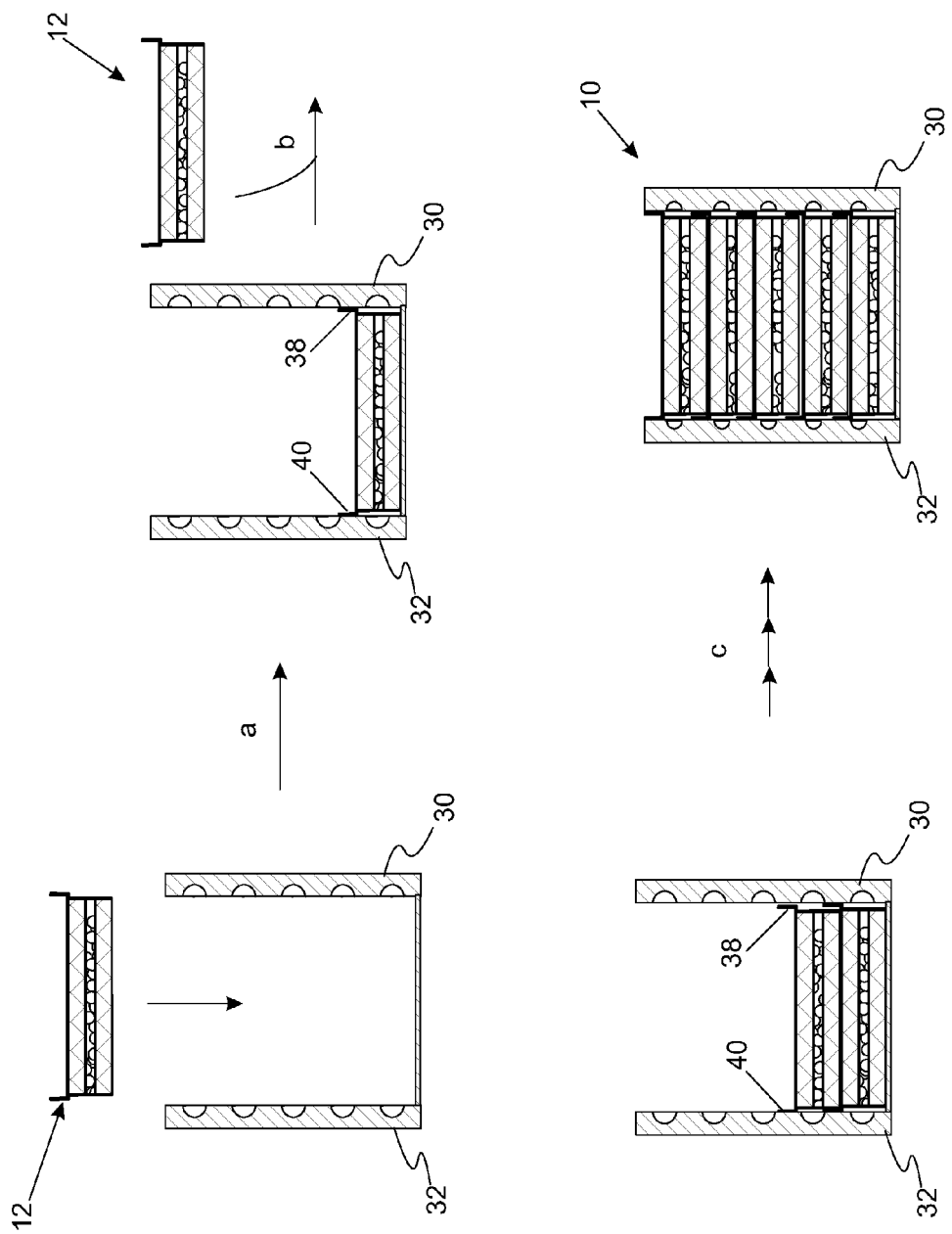
FIG. 4 is a schematic flowchart showing the assembly of a battery module from a plurality of battery modules in which the battery modules are sequentially positioned between heat sink sections.

With reference to FIG. 4, a variation of a method of making battery module assembly 10 set forth above is provided. FIG. 4 is a schematic flowchart showing the assembly of a battery module from a plurality of battery modules in which the battery modules are sequentially positioned between heat sink sections. The method includes a step of forming a plurality of battery cartridges 12 of the design set forth above in FIGS. 1-3. The plurality of battery cartridges 12 are positioned between first heat sink section 30 and second heat sink section 32 and bonded to first heat sink section 30 and second heat sink section 32 at position 38, 40 as indicated by step a). Each battery cartridge 12 is made by placing a battery cell stack within a first receptacle unit of an adjacent cartridge. As set forth above in the descriptions of FIGS. 1-3, the battery stack includes a first battery cell, a second battery cell, and a foam layer interposed between the first battery cell and the second battery cell. The battery cell stack is positioned within the first receptacle unit, with the second receptacle unit also positioned within the first receptacle unit such that the battery cell stack is compressed. In set b), a second battery cartridge 12 is positioned between first heat sink section 30 and second heat sink section 32 and bonded to first heat sink section 30 and second heat sink section 32 at position 38, 40. Step c) represents that one or more additional battery cartridges may be placed between first heat sink section 30 and second heat sink section 32 and bonded thereto. As set forth above, virtually any number of battery cartridges may be used in the battery module.

In a typical, application, battery module assembly 10 includes from 5 to 30 battery cartridges. In a refinement, battery module assembly 10 includes a sufficient number of battery cartridges so that the output voltage is about 0.5 volts. In the variation of the embodiment depicted in FIG. 4, battery cartridges 12 are sequentially positioned between the first heat sink section 30 and the second heat sink section 32 and bonded thereto. In a refinement, first receptacle unit 14 includes edge detail 20 that mates to second receptacle unit 18. In another refinement, edge detail 20 (FIGS. 1-3) includes a rim which receives second receptacle unit 18. Second receptacle 18 is positioned within first receptacle unit 14 and particularly within edge detail 20. In still another refinement, each battery cartridge 12 is bonded to first heat sink section 30 and second heat sink section 32 after being positioned and before an adjacent battery cartridge is positioned.

Figure 5:
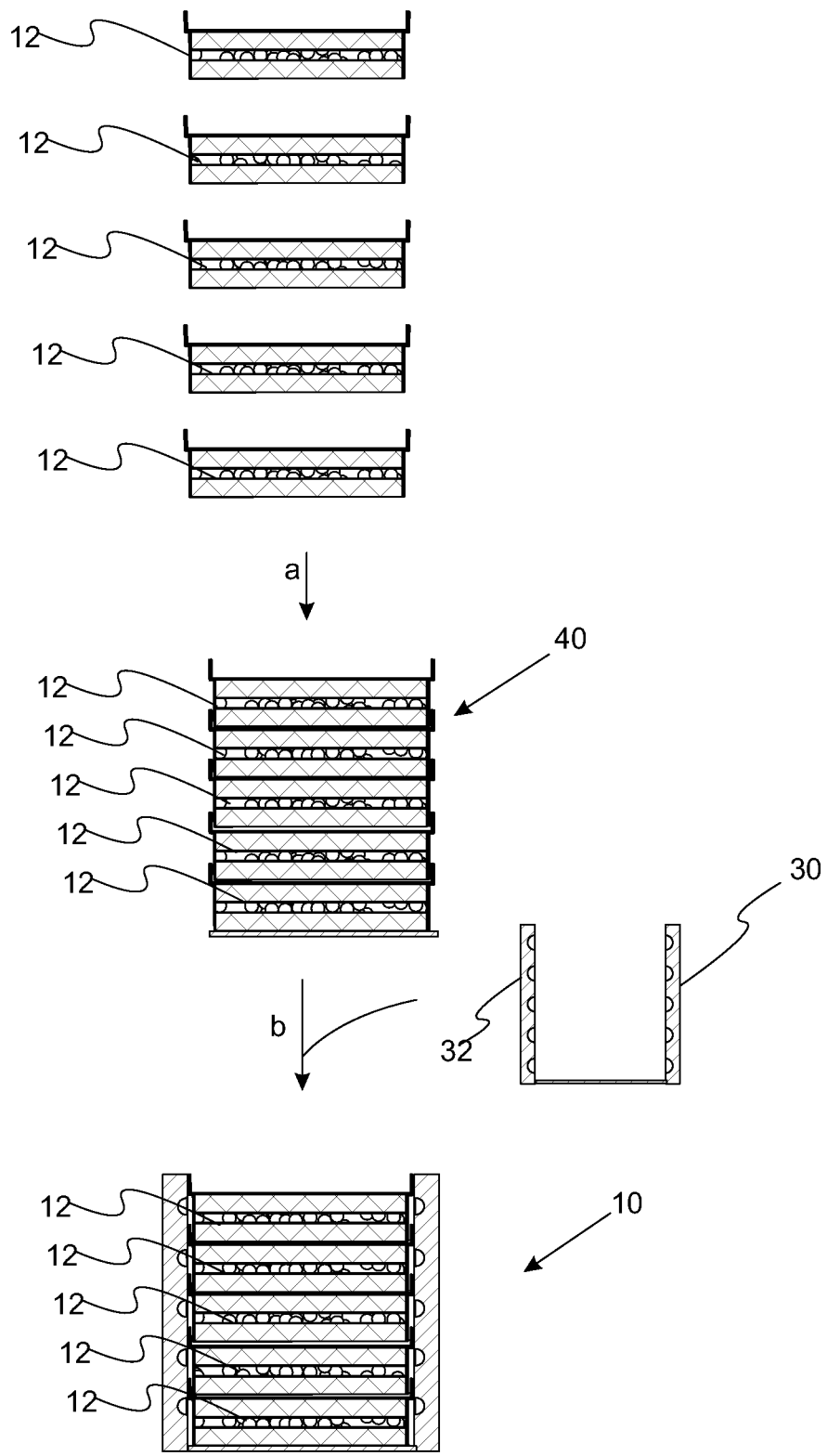
FIG. 5 is a schematic flowchart showing the assembly of a battery module from a plurality of battery modules in which the battery modules are sequentially stacked before being positioned between heat sink sections.

With reference to FIG. 5, another variation of a method of making battery module assembly 10 set forth above is provided. FIG. 5 is a schematic flowchart showing assembly of a battery module from a plurality of battery modules in which the battery modules are sequentially stacked before being positioned between heat sink sections. The method includes a step of forming a plurality of battery cartridges 12 of the design set forth above in FIGS. 1-3. In step a), the battery cartridges 12 are stacked on top of each other to form battery cartridge stack 40. As set forth above in the descriptions of FIGS. 1-3, the battery stack includes a first battery cell, a second battery cell, and a foam layer interposed between the first battery cell and the second battery cell. The battery cell stack 16 is positioned within the first receptacle unit 14, with the second receptacle unit 18 positioned within the first receptacle unit such that battery cell stack 16 is compressed. In step b), a second battery cartridge 12 is positioned between first heat sink section 30 and second heat sink section 32 and bonded to first heat sink section 30 and second heat sink section 32 at position 38, 40. In a refinement, first receptacle unit 14 includes edge detail 20 that mates to second receptacle unit 18 thereby providing both a bonding point for first heat sink section 30 and second heat sink section 32, and protection of battery cells within battery cartridges from the bonding process. In another refinement, edge detail 20 (FIGS. 1-3) includes a rim which receives second receptacle unit 18. Second receptacle 18 is positioned within first receptacle unit 14 and particularly within edge detail 20. As set forth above, virtually any number of battery cartridges may be stacked to form battery stack 40. In a typical application, battery module assembly 10 includes from 5 to 30 battery cartridges. In a refinement, battery module assembly 10 includes a sufficient number of battery cartridges so that the output voltage is about 0.5 volts. In step b), battery cartridges 12 are stacked before being positioned between the first heat sink section 30 and the second heat sink section 32 and bonded thereto. Each battery cartridge 12 is bonded to first heat sink section 30 and second heat sink section 32 after being positioned and before an adjacent battery cartridge is positioned. For example, laser welding may be used to bond the battery cartridges to the heat sink section externally from sides 42, 44.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A battery module assembly comprising:
   a plurality of battery cartridges including a first battery cartridge and a second battery cartridge, the first battery cartridge comprising:
   a first receptacle unit;
   a battery cell stack including a first battery cell, a second battery cell, and a foam layer interposed between the first battery cell and the second battery cell, the battery cell stack positioned within the first receptacle unit;
   a second receptacle unit positioned within first receptacle unit compressing the battery cell stack, the second battery cartridge being stacked on the first battery cartridge with the second battery cartridge being positioned within the first receptacle unit of the first battery cartridge; and
   a receiving assembly holding the plurality of battery cartridges, the receiving assembly including a first heat sink section and a second heat sink section with the plurality of battery cartridges positioned between the first heat sink section and the second heat sink section such that the first receptacle unit and the second receptacle unit operate as cooling fins.

2. The battery module assembly of claim 1 wherein the first receptacle unit includes an edge detail that mates to the second receptacle unit.

3. The battery module assembly of claim 2 wherein the edge detail comprises an outer rim.

4. The battery module assembly of claim 1 wherein the second receptacle unit receives a first receptacle unit of an adjacent battery cartridge.

5. The battery module assembly of claim 1 wherein the plurality of battery cartridges includes from 10 to 25 battery cartridges.

6. The battery module assembly of claim 1 wherein each battery module is bonded to the heat sink section and the second heat sink section.

7. The battery module assembly of claim 1 wherein the first receptacle unit and the second receptacle unit comprises a thermally conductive material.

8. The battery module assembly of claim 7 wherein the first receptacle unit and the second receptacle unit comprises a metal selected from the group consisting of aluminum, copper, and combinations thereof.

9. The battery module assembly of claim 1 wherein the foam layer is compressed to a pressure from about 8 to 20 psi.

* * * * *